W. R. SULLIVAN.
HORSE HITCHING DEVICE.
APPLICATION FILED JUNE 14, 1913.
1,120,422. Patented Dec. 8, 1914.
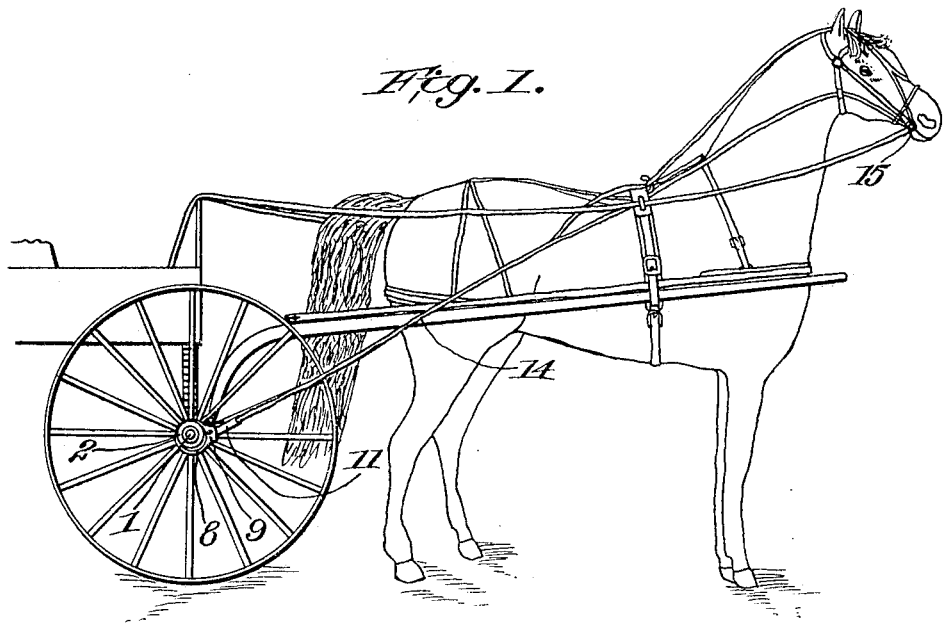
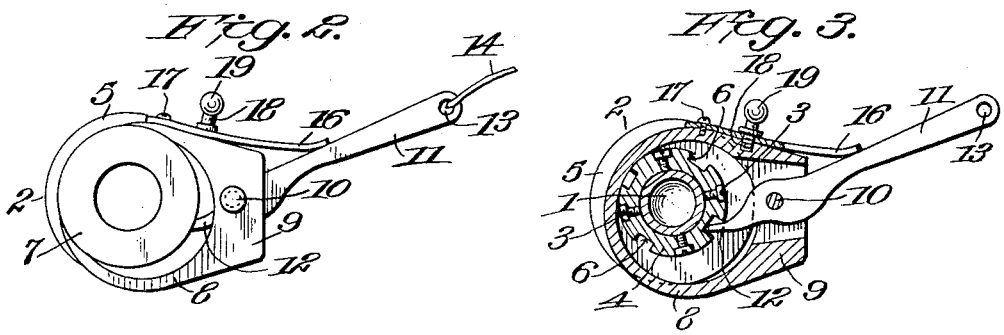
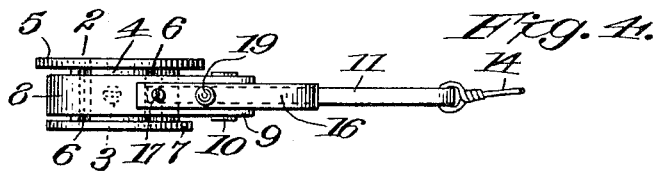
Witnesses
Cecilia Coupé.
Ward B. McCarthy
Inventor
Warren R. Sullivan
By Frank Fuller
Attorney

UNITED STATES PATENT OFFICE.

WARREN R. SULLIVAN, OF MUSKOGEE, OKLAHOMA.

HORSE-HITCHING DEVICE.

1,120,422. Specification of Letters Patent. Patented Dec. 8, 1914.

Application filed June 14, 1913. Serial No. 773,678.

*To all whom it may concern:*

Be it known that I, WARREN R. SULLIVAN, a citizen of the United States, residing at Muskogee, in the county of Muskogee and State of Oklahoma, have invented certain new and useful Improvements in Horse-Hitching Devices, of which the following is a specification.

My invention relates to safety horse hitching devices and it aims to provide a novel device that is adapted for attachment to a vehicle wheel and to a horse mouth bit, characterized by simplified construction, efficiency, and cheapness to manufacture.

The preferred embodiment of the invention is hereafter described in connection with drawings acompanying this application, wherein:—

Figure 1 is a side elevation showing the attachment of the article to a vehicle hub and to a bit: Fig. 2 is a side elevation of the improved device:—Fig. 3 is a vertical sectional view of said device and supporting hub and, Fig. 4 is a plan view of the device.

Throughout said view like reference characters designate like or corresponding parts.

Referring specifically to the drawings 1 designates the hub of a vehicle wheel and 2 generally a thimble or notched member which is rigidly fastened to the hub as by means of set screws, 3, passing through a shank or sleeve 4 of the thimble, being tightly clamped against the hub. This shank extends from a guard wall or member in the shape of an annular flange, 5. Said shank is provided on its periphery with one or a plurality of notches, 6, and at its end opposed to guard member 2 is a second or reduced guard member or head in the form of an annular flange 7.

Over the head 7 is adapted to be passed a hitching member and more specifically an open attaching member 8 thereof, the opening of which is a size larger than the head 7 to permit the passage of the attaching member readily thereover. In a hollow enlargement 9 of the hitching member is pivoted on a pin or member 10, a coupling member or pawl 11 formed at one end 12, of suitable shape to engage the notches 6 and at its other end with an opening 13 through and at which is passed and fastened a flexible check cord, or rein, 14, which is in turn fastened in any suitable manner at 15, to a horse's mouth bit. Bearing upon the pawl is a leaf spring, 16, which is fastened to the hitching member as by means of a set screw 17, and a set screw 18 having a head or finger piece 19 thereon.

Before hitching the horse, the hitching member 8 is detached from the notched member and supported on the vehicle or harness in any desired manner. In hitching, the pawl 11 and the head screw 19 are grasped by the fingers and the pawl drawn against the tension of the spring 16 toward said head, so that end 12 will project but slightly beyond the enlargement 9. Thereupon the hitching member is placed over head 7, its extent of movement being limited by the larger guard wall 5. After passing over head 7, pawl 11 is released, whereupon spring 16 presses the pawl into engagement with one of the notches 6 and draws the inner wall of member 8 at one portion against the shank 4, in which position it is prevented from sliding off the shank by the guard walls 5 and 7. In detaching the hitching member, head 19 and pawl 11 are engaged by the fingers, and thereupon slipped over head 7. Should the horse attempt to draw the vehicle along while hitched as described, the turning of the vehicle wheel would turn the notch member, which through engagement of pawl 11 therewith, would move the pawl downwardly, thus tightening the bit within the mouth of the horse, the incidental pain causing the animal to halt.

Changes in the detail of construction of the device may be made within the spirit and scope of the appended claims.

Having thus described my said invention what I claim is:

1. In a device of the class described, a thimble, said thimble provided with a notch, a head thereon, a detachable hitching member passable over said head and means to normally prevent disengagement of the said thimble and member having a pawl engageable with said notch and a spring associated with said pawl to normally maintain the pawl in engagement with the notch.

2. In a device of the class described, a thimble provided with a notch, a hitching member engaging said thimble, a pivoted pawl on said hitching member, means to prevent accidental detachment of said hitching member from the thimble, and a spring bearing against said pawl maintaining said hitching member in operative relation to said means, said construction permitting use of the device on a wheel on either side of a vehicle.

3. In a device of the class described, a thimble provided with a notch, a hitching member engaging said thimble, a pivoted pawl on said hitching member, and a spring bearing against said pawl, and a finger piece on said hitching member adjacent said pawl, said pawl located adjacent the finger piece for the purpose specified.

4. In a device of the class described, a thimble having a shank provided with a notch and with guard members, a hitching member detachably engaging said shank, and a pawl engaging said notch maintaining said hitching member in operative relation to the guard member to prevent accidental detachment of the hitching member from the thimble.

5. In a device of the class described, a thimble having a shank provided with a notch and with guard walls, a hitching member detachably engaging said shank, a pawl engaging said notch normally maintaining the hitching member against detachment, one of said walls permitting and the other prohibiting the passage of the hitching member thereover.

6. In a device of the class described, a thimble having a shank provided with a notch and provided with a guard wall, a hitching member detachably engaging said shank, a pawl on said member engaging said notch, and a spring bearing on said pawl maintaining said hitching member in operative relation to the guard wall to prevent accidental detachment of the hitching member from the thimble.

7. In a device of the class described, a thimble having a shank provided with a notch and with guard walls, said walls normally preventing disengagement of the hitching device from the thimble, a hitching member detachably engaging said shank, a pawl on said member engaging said notch, a spring bearing on said pawl, a head on said hitching member, and a check member fastened to said pawl.

In testimony whereof I affix my signature in presence of two witnesses.

WARREN R. SULLIVAN.

Witnesses:
J. W. KING,
WM. C. L. V. CORREY.

Copies of this patent may be obtained for five cents each, by addressing the "Commissioner of Patents, Washington, D. C."